United States Patent
Matsuo

(10) Patent No.: US 8,709,196 B2
(45) Date of Patent: Apr. 29, 2014

(54) METHOD OF JOINING SHEET MEMBER AND SHEET JOINED BODY

(75) Inventor: Naoyuki Matsuo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 293 days.

(21) Appl. No.: 12/647,204

(22) Filed: Dec. 24, 2009

(65) Prior Publication Data

US 2010/0167060 A1 Jul. 1, 2010

(30) Foreign Application Priority Data

Dec. 25, 2008 (JP) .................. 2008-330036

(51) Int. Cl.
*B29C 65/14* (2006.01)

(52) U.S. Cl.
USPC ............. 156/304.6; 156/304.1; 156/502

(58) Field of Classification Search
USPC ................. 156/304.6, 502, 304.1
See application file for complete search history.

(56) References Cited

U.S. PATENT DOCUMENTS

| | | | |
|---|---|---|---|
| 3,384,526 A | | 5/1968 | Abramson et al. |
| 3,528,867 A | | 9/1970 | Leatherman et al. |
| 3,769,124 A | * | 10/1973 | Johnson ............... 156/159 |
| 4,001,067 A | * | 1/1977 | Johnson ............... 156/159 |
| 4,240,855 A | * | 12/1980 | Pennington ........... 156/159 |
| 4,983,241 A | * | 1/1991 | Sawada et al. ........ 156/157 |
| 2002/0081956 A1 | * | 6/2002 | Bennett et al. ........ 451/398 |
| 2004/0035524 A1 | | 2/2004 | Link |
| 2005/0117856 A1 | * | 6/2005 | Huang et al. ............ 385/96 |
| 2008/0060531 A1 | * | 3/2008 | Szymanski ............. 99/373 |
| 2009/0135150 A1 | * | 5/2009 | Takashima et al. ...... 345/173 |

FOREIGN PATENT DOCUMENTS

| | | |
|---|---|---|
| GB | 2301796 A | 12/1996 |
| JP | 08-118473 A | 5/1996 |
| JP | 2001-18293 A | 1/2001 |
| JP | 2008-087183 A | 4/2008 |
| WO | 89/10832 A1 | 11/1989 |

OTHER PUBLICATIONS

Japanese Office Action dated Jul. 8, 2011, issued in corresponding Japanese Patent Application No. 2008-330036.
European Search Report dated Feb. 23, 2010, issued in corresponding European Patent Application No. 09016044.1.
Japanese Office Action dated Apr. 15, 2011, issued in corresponding Japanese Patent Application No. 2008-330036.

* cited by examiner

*Primary Examiner* — Mark A Osele
(74) *Attorney, Agent, or Firm* — Westerman, Hattori, Daniels & Adrian, LLP

(57) ABSTRACT

An object of the present invention is to provide a method of joining sheet members together that is capable of joining two sheet members together without causing a stepped portion on a joined portion. Provided is a method of joining a first sheet member and a second sheet member together, which includes bringing an end face of the first sheet member into abutment with an end face of the second sheet member to provide an abutted portion, heating the abutted portion via a heating medium to thermal-fusion-bond the end faces with each other, and peeling off the heating medium from the first and second sheet members after the thermal-fusion bonding.

2 Claims, 5 Drawing Sheets

METHOD OF JOINING SHEET MEMBER AND SHEET JOINED BODY

CROSS REFERENCE TO RELATED APPLICATION

This application claims priority from Japanese Patent Application No. 2008-330036, which is incorporated herein by reference.

BACKGROUND OF THE INVENTION

1. Field of the Invention

The present invention relates to a method of joining sheet members together and a sheet jointed body, and more particularly to a method of joining sheet members together, in which band-shaped sheet members are jointed together, and a sheet joined body formed by joining band-shaped sheet members together.

2. Description of the Related Art

Hitherto, when band-shaped sheet members are to be continuously fed to a processing machine to be processed, a leading end of a newly fed sheet member is joined to a tail end of a preceding sheet member so as to successively feed the newly fed sheet member subsequent to the preceding sheet member to the processing machine.

Hitherto, as a joining method of this kind, as shown in FIG. 5A, a tail end of a preceding sheet member 101 is held abutting against a leading end of a newly fed sheet member 102, and adhesive tapes 103, 103 are attached to both the sheet members onto both the upper and lower surfaces, covering the abutted portion, thereby joining the two sheet members 101, 102 together.

In a case where the sheet members 101, 102 are joined together by the above method, a stepped portion is caused at a joined portion due to the adhesive tapes 103. For example, a coated film coated in a subsequent coating step may cause liquid stagnation due to the stepped portion, or a conveying roll or a nip roll may contact edges of the adhesive tapes 103 and hence may be contaminated or damaged. Another problem lies in that an adhesive agent of the adhesive tapes 103 may be fluidized due to the heat such as in a drying step, and hence the adhesive strength may be deteriorated.

As shown in FIG. 5B, there is proposed another method of joining the sheet members 101, 102, in which a newly fed sheet member 102 is overlapped onto a preceding sheet member 101, and they are joined together via an adhesive tape 103 previously disposed at a leading end portion of the newly fed sheet member 102, and then a side rearward to the preceding sheet member 101 is cut.

However, when the above method is employed, a stepped portion of the joined portion is further enlarged and a tail extension 104 is formed at the tail end of the preceding sheet member 101, which causes a problem in that the tail extension 104 flutters when in conveying the sheet members, and there is a problem in that generation of refuses is triggered, in addition to the aforesaid problem due to the stepped portion.

SUMMARY OF THE INVENTION

In consideration of the above conventional problems, it is an object of the present invention to provide a method of joining sheet members together that is capable of joining two sheet members together without causing a stepped portion on a joined portion. It is another object of the present invention to provide a sheet joined body that has no stepped portion at a joined portion.

According to the present invention, there is provided a method of joining a first sheet member and a second sheet member together, which includes bringing an end face of the first sheet member into abutment with an end face of the second sheet member to provide an abutted portion, heating the abutted portion via a heating medium to thermal-fusion-bond the end faces with each other, and peeling off the heating medium from the first and second sheet members after the thermal-fusion bonding.

In the sheet member joining method of the present invention, the heating medium is preferably an interposing material that includes any one of a thermoplastic resin having a fusing point higher than that of the first and second sheet members and a thermosetting resin having no fusing point, in which the abutted portion is heated and pressurized by heat plating via the interposing material.

In the sheet member joining method of the present invention, the heating medium is preferably an interposing material that includes any one of a thermoplastic resin having a fusing point higher than that of the first and second sheet members and a thermosetting resin having no fusing point, and contains a light absorbing agent or has a light absorbing agent coated on the surface of the interposing material, in which the abutted portion is heated by laser irradiation via the interposing material.

Furthermore, according to another aspect of the present invention, there is provided a sheet joined body manufactured by any one of the aforesaid sheet member joining methods.

According to the method of joining sheet members and the sheet joined body of the present invention, a preceding first sheet member and a newly fed second sheet member subsequent to the first sheet member are held in a state where they are joined together via only the end faces thereof, and therefore no stepped portion is created on the joined portion, which produces an advantageous effect of omitting problems due to the stepped portion of the joined portion in the respective subsequent steps.

Since they are joined together without using a tacky agent or the like, there are provided advantageous effects in that the adhesive power is unlikely to be deteriorated even if the joined portion is heated, and thus the preceding first sheet member and the newly fed second sheet member subsequent thereto are unlikely to be separated from each other.

Furthermore, in a case where the heating medium is an interposing material having the above structure, it is possible to intensively heat only the area with which the interposing material is held in contact, and moreover, the interposing material is more securely attached to the boundary portion between the first sheet member and the second sheet member, and therefore the joined portion of the sheet members are brought into a remarkably flat condition.

BRIEF DESCRIPTION OF THE DRAWINGS

FIGS. 4A and 4B show a sheet joined body of one embodiment, in which

FIG. 4A is a plan view and FIG. 4B is a cross sectional view.

DESCRIPTION OF THE PREFERRED EMBODIMENTS

Hereinafter, preferred embodiments according to the present invention will be described with reference to the attached drawings.

Figure 1:
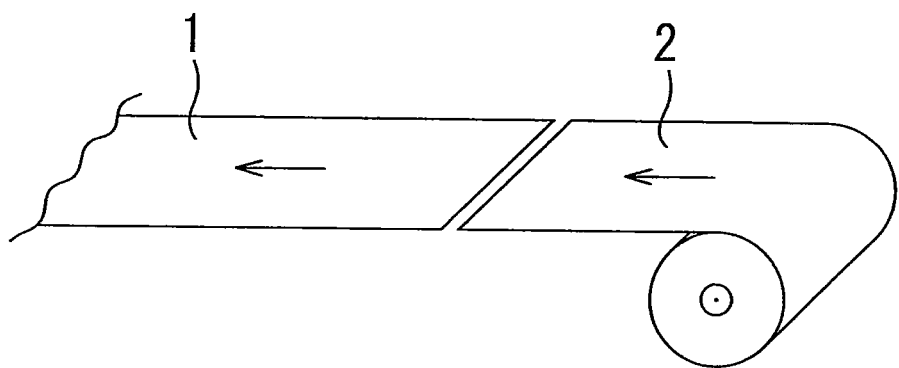
FIG. 1 is a perspective view showing the relationship between a preceding first sheet member 1 and a newly fed second sheet member 2 subsequent thereto, before a joining method of this embodiment is applied.

FIGS. 1 to 3 show embodiments of a sheet member joining method of the present invention. As shown in FIG. 1, a sheet member joining method of this embodiment is applicable to a case, where a sheet member 1 (hereinafter referred also to a first sheet member) formed into an elongated band shape and made of a thermoplastic resin is fed to a predetermined processing means (not shown), during the feeding of the first sheet, a newly fed sheet member 2 (hereinafter referred also to a second sheet member) made of the same material is joined to the first sheet member 1 at the timing, at which a terminal end of the first sheet member 1 is about to be rolled out, thereby continuing the processing steps by the processing means.

The first sheet member 1 and the second sheet member 2 are generally made of the same kind of thermoplastic resin, while on the other hand, the sheet members of the present invention are not necessarily limited to the sheet members made of the same kind of material, and as long as materials are capable of being thermal-fusion-bonded with each other, the sheets may be made of different kinds of material. For example, it is possible to use different kinds of thermoplastic resins having compatibility.

Examples of the thermoplastic resin include polycarbonate, polyvinyl alcohol, polyethylene, polypropylene, polyethylene terephthalate, polyvinyl chloride, thermoplastic polyimide, triacetylcellulose, polymethyl methacrylate, norbornene resin, polyoxymethylene, polyether ether ketone, polyetherimide, polyamideimide, polybutadiene, polyurethane, polystyrene, polymethylpentene, and polyamide.

Since the processing treatment to sheet members is made while being conveyed by a so-called roll-to-roll system, the thickness of a sheet member is preferably in the range of 1 μm to 2 mm, and more preferably in the range of 10 μm to 200 μm.

A sheet member may be of a single layer or plural layers. A sheet member of plural layers may be made by, for example, a laminate of a substrate layer and a protection film layer with a tacky agent.

In a case where such sheet members of plural layers are joined together, it is possible to temporarily peel off each layer to allow the respective layers to be joined independently of each other, or possible to join the plural layers without peeling. In a case where a substrate layer has poor compatibility with a protection film layer and does not form mixed layers even if they are molten, the substrate layer and the protection layer can be peeled off after the joining, even when they are joined together while they are kept in plural layers.

Figure 2A:
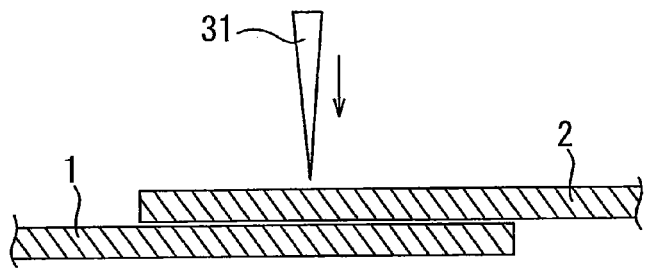
FIGS. 2A-2D are schematic step views, showing the method of joining sheet members together according to a first embodiment.

FIGS. 2A-2D are schematic step views, showing the method of joining sheet members together according to the present invention. In the first embodiment, as shown in FIG. 2A, a terminal end portion of the preceding first sheet member 1 and a leading end portion of the newly fed second sheet member 2 are overlapped to each other, and a given position of an overlapped area is cut by a cutting means 31.

Figure 2B:
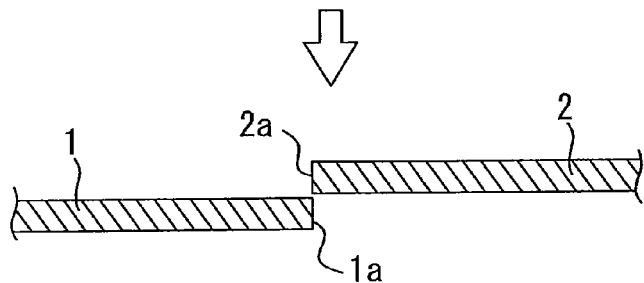

As shown in FIG. 2B, the tail end of the first sheet member 1 and the leading end of the second sheet member 2 have the same end face shapes (a tail end face 1a of the first sheet member 1 and a leading end face 2a of the second sheet member 2), by the above cutting.

No limitation is intended to the shape of the cutting line, and for example, it may be of a straight line shape, a wave shape or a serration shape. From the view points of that the joining strength is to be increased by increasing the joining area of the sheet members and a sheet is to be prevented from being broken apart by dispersing the stress applied to the joined surface in the subsequent processing steps, it is preferable to employ a wave shape, a serration shape or the like, or to cut diagonally relative to a width direction of the sheet members.

Figure 2C:
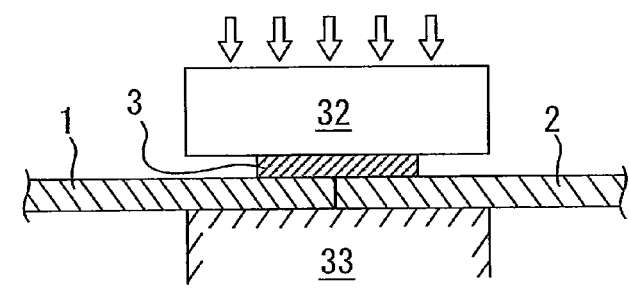
Figure 2D:
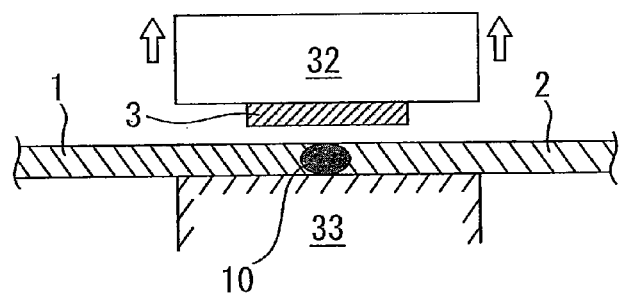

Then, as shown in FIG. 2C, the tail end face 1a of the first sheet member 1 and the leading end face 2a of the second sheet member 2, formed in the above manner are brought into abutment with each other, an interposing material 3 is mounted on an abutted portion, and they are heated and pressed on a base plate 33 by pressing a heat plate 32 thereto from above. Whereby, the tail end face 1a and its periphery of the first sheet member 1 and the leading end face 2a and its periphery of the second sheet member 2 are heated, molten, fused to each other, again coagulated and thereby thermal-fusion-bonded via the interposing material 3. Then, after thermal-fusion-bonding has been completed, as shown in FIG. 2D, a heat plate 32 is pulled upward and the interposing material is peeled off, thus completing the joining of the sheet members 1, 2.

No limitation is intended to the heat plate 32, as long as it can heat the joined area of the sheet members 1, 2 to the fusion temperature or higher. However, from the view point that a band shaped sheet member can be efficiently heated and pressured across the width thereof, a heat plate having a rectangular pressing face extending across the entire width of the sheet member can be appropriately used.

Furthermore, as a means for fixing a sheet member on the base plate 33, for example, a means for fixing by suction a sheet member on the surface of the base plate 33 by generating negative pressure, or any other conventional means for fixing a resin film may be employed.

For the interposing material 3, a thermoplastic resin having a fusing point higher than the sheet members as joining targets, or a thermosetting resin having no fusing point can be appropriately used. In a case where a thermoplastic resin having a fusing point higher than the sheet members is used, the thermoplastic resin having a fusing point 30° C. or higher than the fusing point of the thermoplastic resin forming the sheet members is preferable. As a thermosetting resin, a thermosetting polyimide is preferably used.

Furthermore, the interposing material 3 has a thickness of preferably 20-500 μm and more preferably 25-150 μm from the view point that heat from the heat plate can be easily transferred to sheet members therethrough.

The heating via the interposing material 3 can prevent the sheet members 1, 2 from being fusion bonded to the heat plate 32.

The heating via the interposing material 3 enables a sheet member to be easily peeled off along with an interposing material without fusion bonding to a heat plate.

Now, the description will be made for a second embodiment of the present invention with reference to FIGS. 3A-3D. In the second embodiment, the same reference codes are allocated to the same members or parts of the first embodiment to omit the description thereof.

A method of joining sheet members of the second embodiment includes, as shown in FIGS. 3A-3D, cutting the first and second sheet members 1, 2 to form end faces 1a, 1b (FIGS. 3A and 3B), and then the end faces 1a, 1b are thermal-fusion-bonded to each other by laser irradiation.

Figure 3A:
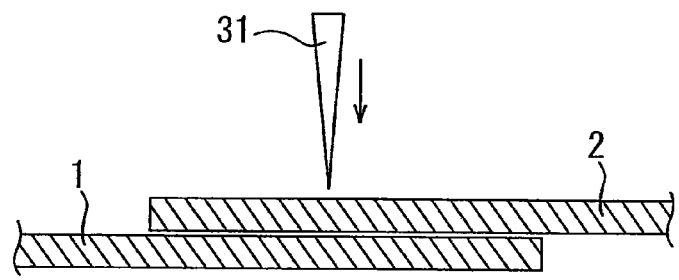
FIGS. 3A-3D are schematic step views showing the method of joining sheet members together according to a second embodiment.
Figure 3B:
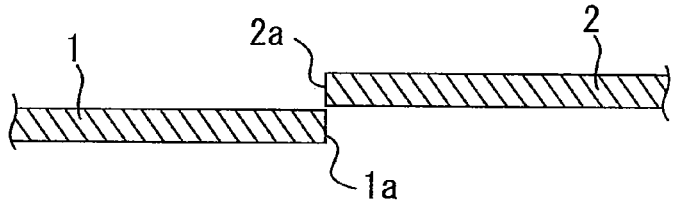
Figure 3C:
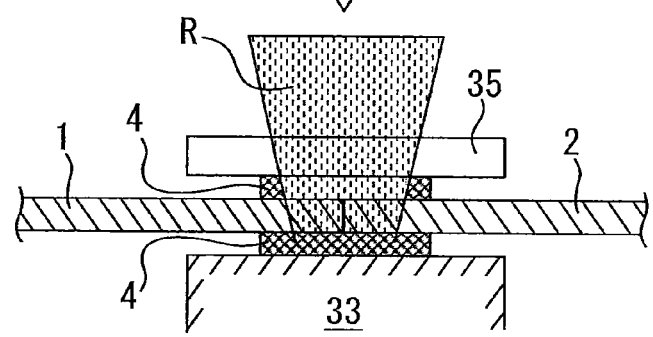

Specifically, as shown in FIG. 3C, the tail end face 1a of the first sheet member 1 and the leading end face 2a of the second sheet member 2 formed by cutting are brought into abutment with each other, and the abutted portion is held from above and below with interposing materials 4, 4 which produce heat by laser irradiation, and further held between the base plate 33 and the glass plate 34 as fixing means to be fixed in position. Then, laser light R is irradiated from above the glass plate 35 to let the interposing materials 4, 4 produce heat. Whereby, the tail end face 1a and its periphery of the first sheet member 1 and the leading end face 2a and its periphery of the second sheet member 2 are molten, fused to each other, again coagulated and thereby thermal-fusion-bonded with each other in the same manner as the first embodiment.

Figure 3D:
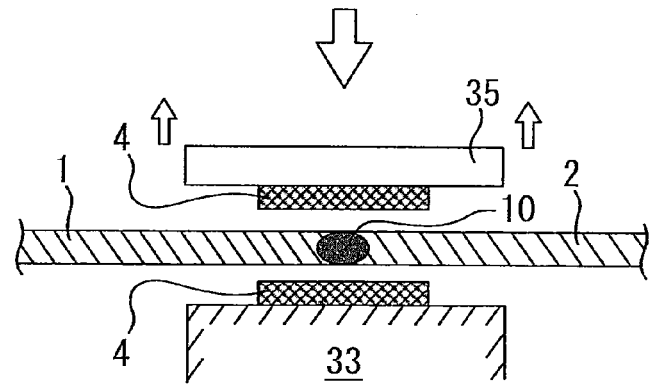

Then, after the thermal-fusion-bonding has been completed, as shown in FIG. 3D, the glass plate 35 is pulled upward and the interposing materials 4, 4 are peeled off, thus completing the joining of the sheet members 1, 2.

No limitation is intended to the laser light R, as long as it can thermal-fusion-bond sheet members via the interposing materials 4, 4. For example, laser light produced by various oscillation means, such as semiconductor laser, Nd-YAG laser and fiber laser can be employed, and for the oscillation method, it is possible to employ so-called CW laser (Continuous Wave Laser), or pulse laser such as femtosecond laser, which continuously irradiate laser light. Among them, semiconductor laser and fiber laser can be appropriately used from the view point that uniform in-plane beam strength can be easily produced.

Moreover, the wavelength of the laser light is preferably in near infrared wavelength range from the view point that it is excellent in penetration capability through many resin materials, facilitates laser light to reach an interface between the sheet members, and facilitates the thermal-fusion-bonding at the interface without causing adverse influences on the front side of the sheet members.

For the interposing materials 4, a thermoplastic resin having a fusing point higher than the sheet members, or a thermosetting resin having no fusing point is appropriately usable in the same manner as the interposing material 3 of the first embodiment. Furthermore, a material including a light absorbing agent, which is excellent in absorption of laser light is preferably used. Examples of the light absorbing agent include pigment, dye and carbon black with porphyrin compound used therein. The light absorbing agent is preferably used by being coated on the surface of an interposing material, and the surface with the light absorbing agent is preferably used by being held in contact with the sheet members. As a coating technique, for example, a conventional technique, such as inkjet, coater, dispenser, splay or printing may be used.

In a case where laser light is irradiated, since a layer containing a light absorbing agent produces heat, the thickness of an interposing material is preferably not less than 10 μm but not more than 500 μm, taking into account the handling performance, although the thickness of the interposing material is not limited to a specific thickness.

No limitation is intended to the irradiation form of the laser light R, and, for example, a light beam crossing the entire width of an abutted area of sheet members may be irradiated, or plural laser beams disposed with certain intervals in the width direction of sheet members may be irradiated. Alternatively, the laser light R may be scanned in the longitudinal direction or width direction of sheet members to carry out thermal-fusion-bonding for a required area.

Figure 4A:
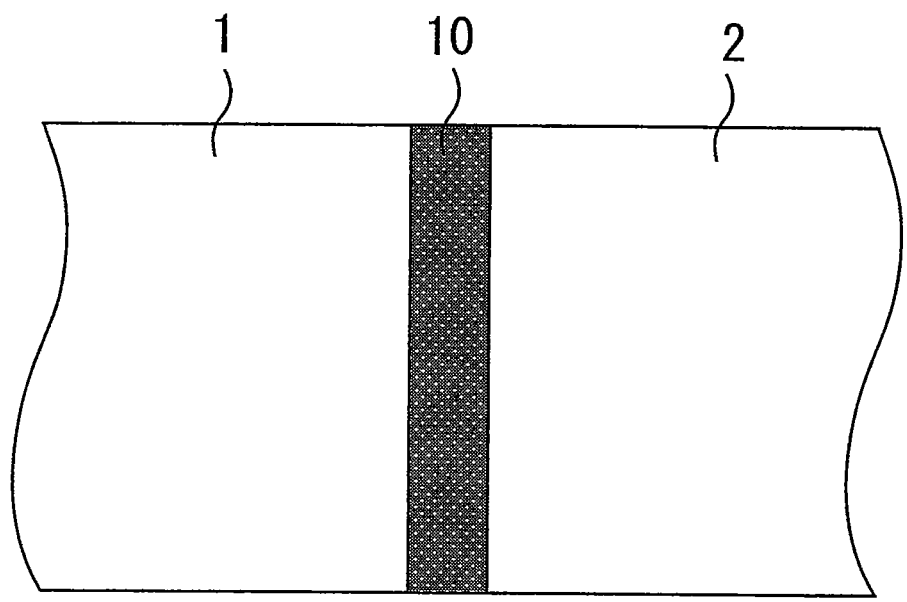
Figure 4B:
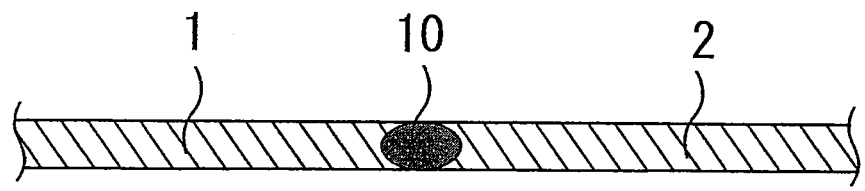
Figure 5A:
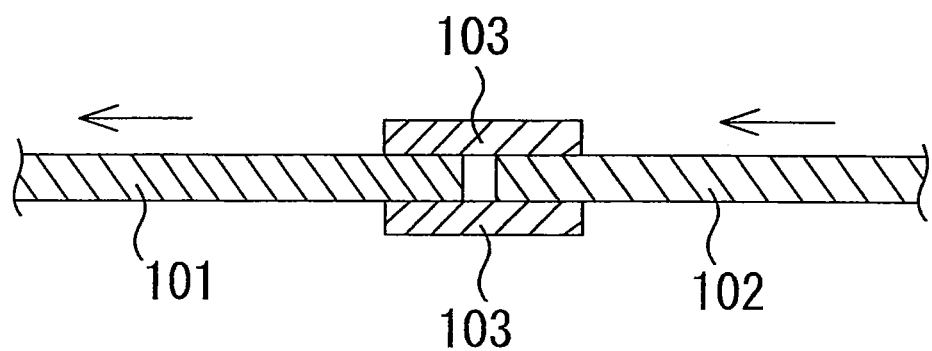
FIGS. 5A and 5B show a joining method of sheet members according to a prior art.
Figure 5B:
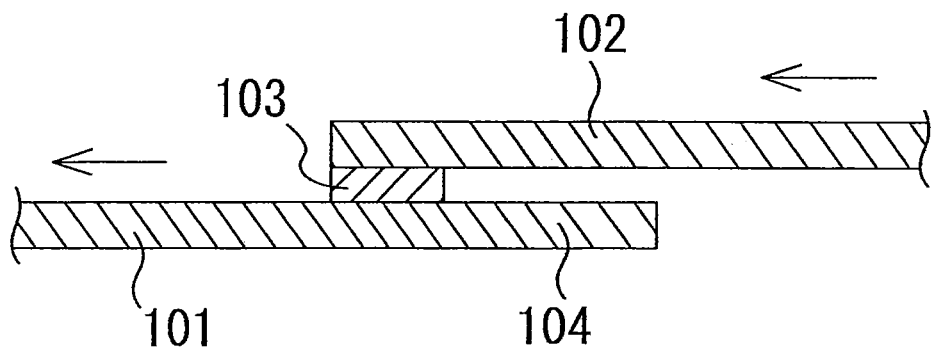

FIGS. 4A and 4B show an example of a sheet joined body of the present invention, in which FIG. 4A is a plan view and FIG. 4B is a cross sectional view showing the structure of the joined portion. As shown in FIG. 4B, the first and second sheet members 1, 2 joined together cause no stepped portion on the joined portion 10, and thus have the same thickness as that of the remaining portion.

Accordingly, a thus produced sheet joined body has no stepped portion on the joined portion, and therefore it is possible to prevent damages of conveying rollers, nip rollers or other rollers, or various problems in, for example, a coating step, a stretching step, a drying step or the like, and furthermore prevent contamination due to fluttering of a tail extension of a sheet member.

Furthermore, since the joined portion 10 is also made of the same resin material as that of a body portion of each of the sheet members 1, 2, it is possible to carry out the same treatment as that of the remaining portion of each of the sheet members 1, 2 in various subsequent treatment steps.

In the present invention, it is a matter of course to appropriately employ conventional technical matters to such an extent as not to significantly deteriorate advantageous effects of the present invention.

For example, the aforesaid embodiments were described by taking, for example, a case where the joined portion 10 is formed to extend continuously across the width direction of the sheet members 1, 2, but, it is not necessary to limit the present invention thereto. For example, joined portions of the sheet members may be formed with certain intervals in the width direction to join sheet members together.

A cooling step may be provided to cool the heated sheet members in order to promote re-coagulation of molten and fused resins.

The first embodiment, which uses the heat plate, was described by taking, for example, a case where the heat plate and the interposing material are disposed only above the sheet members, but the present invention is not necessarily limited to this embodiment. For example, it is possible to employ an arrangement where interposing materials and heat plates are respectively provided above and below the sheet members so as to heat the sheet members via the interposing materials from both above and below.

The second embodiment, which uses the laser irradiation, was described by taking, for example, a case where the interposing materials containing a light absorbing agent are disposed above and below the sheet members, but the present invention is not necessarily limited to this embodiment. For example, it is possible to employ an arrangement where an interposing material containing a light absorbing agent is disposed only above the sheet members, and a stage, which produces heat by absorbing laser light, is disposed below the sheet members so as to heat the sheet members directly from the stage.

The second embodiment, which uses the aforesaid laser irradiation, was described by taking, for example, a case where the base plate and the glass plate are used as a fixing means for fixing the sheet members in position, but the present invention is not necessarily limited to this embodiment. For example, it is possible to employ an arrangement where a spherical glass or cylindrical glass is employed in place of the glass plate, which is rolled in synchronization with the laser irradiation.

EXAMPLES

Now, the description will be made in more detail for the present invention by citing examples with no intention to limit the present invention thereto.

Example 1

Two sheet members A1 made of TAC (triacetylcellulose) (width: 50 mm, thickness: 80 μm) were used, whose end portions were overlapped with each other, fixed in position, and cut by a cutter. End faces of the two sheet members formed by cutting were brought into abutment with each other to have an abutted portion, to which an interposing material B1 made of polyimide (manufactured by DU PONT-TORAY CO., LTD., trade name: Kapton-V, thickness: 25 μm, 50 mm×5 mm) was attached. Then, the two sheet members were placed on a base plate, and pressed with a heat plate via an interposing material B1 to carry out heating and pressing for 10 seconds at 280° C. and 5 kgf/cm$^2$.

Consequently, the sheet members A1 have been thermal-fusion-bonded with each other, and the interposing material B1 could be easily peeled off from the sheet members A1, and thus the sheet members A1 could be joined together with creating no stepped portion. The thus produced sheet joined body was measured in terms of tensile strength, and it was found that the sheet joint body has a high strength of namely 70N/25 mm.

Example 2

By using sheet members A2 made of the same material as that of Example 1 and having a width of 1400 mm and an interposing material B2 made of the same material as that of Example 1 and having a size of 1400 mm×20 mm, a joining test was carried out in the same manner as Example 1.

Consequently, it was found that the sheet members A2 are well joined to each other across the entire width. The joined body was conveyed from a roll to a roll with a tension of 500 N applied thereto, and could be conveyed without rupturing of the sheet members A2. Since no stepped portion exists, it was found that no adverse influences are affected on a nip roll.

Example 3

By using sheet members A3 made of polyethylene terephthalate (PET) and having a width of 1000 mm and an interposing material B3 made of the same material as that of Example 1 and having a size of 1000 mm×20 mm, a joining test was carried out in the same manner as Example 1.

Consequently, it was found that the sheet members A3 are well joined together across the entire width. The joined body was conveyed from a roll to a roll with a tension of 200 N applied thereto, and could be conveyed without rupturing of the sheet members A3. Since no stepped portion exists, it was found that no adverse influences are affected on a nip roll.

Example 4

Two sheet members A4 made of TAC (triacetylcellulose) (width: 1000 mm, thickness: 80 μm) were used, whose end portions were overlapped with each other, fixed in position, and cut by a cutter. An interposing material B4 was prepared by coating Clearweld (manufactured by GENTEX Corporation, trade name: LD120C) in a wet condition to a film made of polyimide (manufactured by DU PONT-TORAY CO., LTD., trade name: Kapton-V, thickness: 125 μm, 1000 mm×5 mm) to have a thickness of 8 μm. Then, end faces of the two sheet members formed by cutting were brought into abutment with each other to have an abutted portion, to which the interposing material B4 was placed to have the light-absorbing-agent coated surface contacting the upper and lower sides of the abutted portion of the sheet members A4. Then, while applying pressure of 17 kgf/cm$^2$ with a glass plate, laser (semiconductor laser, wavelength: 940 nm, spot diameter: 2 mm φ, output: 50 W) was irradiated while being scanned at a rate of 100 mm/sec.

Consequently, it was found that the sheet members A4 were molten and thermal-fusion-bonded with each other. Then, by stopping pressurizing with the glass plate, and peeling off the interposing material B4 from the sheet members A4, it was found that the sheet members A4 were joined together with creating no stepped portion. The produced sheet joined body was measured in terms of tensile strength, and it was found that the sheet members are joined together with a high strength of, namely, 100 N/25 mm width.

When the joined substrate material was conveyed from roll to roll with a tensile force of 300 N applied thereto, it could be conveyed without rupturing of the joined portion, and it was found that no adverse influences are caused on a nip roll even when it has passed therethrough.

Comparative Example 1

In the same manner as Example 1, end faces of sheet members A were brought into abutment with each other, and then an adhesive tape (manufactured by Nitto Denko Corporation, trade name: DUNPLON Tape) was attached to the abutted portion from both the front side and the rear side, and thereby the sheet members A were joined together.

Consequently, the sheet members A were well joined together, but it was found that a nip roller was scratched due to a stepped portion of the joined portion, and a coating liquid was stagnated on the joined portion.

Comparative Example 2

An end portion of a sheet member A is overlapped with an end portion of another sheet member A, and an adhesive tape (manufactured by Nitto Denko Corporation, trade name: DUNPLON Tape) was attached only to the front side of the sheet members, and thus the sheet members A were joined together.

Consequently, the sheet members A were well joined together, but it was found that a nip roller was scratched due to a stepped portion of the joined portion, and a coating liquid was stagnated on the joined portion. Furthermore, a tail extension formed on the rear aide with no adhesive tape attached thereto fluttered during conveyance, and it was found that dusts were generated.

Comparative Example 3

An end portion of a sheet member A was overlapped with an end portion of another sheet member A, and the overlapped portion was irradiated with laser light and thus the sheet members A were joined together.

The sheet members were well joined together, but problems due to a stepped portion and a tail extension were caused in the same manner as Comparative Example 2.

This specification is by no means intended to restrict the present invention to the preferred embodiments set forth therein. Various modifications to the method of joining sheet members together and the sheet joined body, as described herein, may be made by those skilled in the art without departing from the spirit and scope of the present invention as defined in the appended claims.

What is claimed is:

1. A method of joining a first sheet member and a second sheet member together, which includes
   forming an end face of the first sheet member and an end face of the second sheet member by overlapping the first sheet member and the second sheet member and cutting a given position of an overlapping area, wherein the first sheet member has an elongated band shape having a thickness in the range of 1 μm to 2 mm and is drawn out from a roll, and the second sheet member has an elongated band shape having a thickness in the range of 1 μm to 2 mm and is drawn out from a roll,
   bringing the end face of the first sheet member into abutment with the end face of the second sheet member to provide an abutted portion,
   heating the abutted portion via a heating medium to thermal-fusion-bond the end faces with each other, and
   peeling off the heating medium from the first and second sheet members after the thermal-fusion bonding, wherein
   the heating medium is an interposing material that includes thermosetting polyimide, has a light absorbing agent coated on the surface of the interposing material, and has a film shape having a thickness in the range of 20 μm to 500 μm, in which the abutted portion is heated by laser irradiation via the interposing material.

2. The method according to claim 1, wherein the sheet members are made of a thermoplastic resin.

* * * * *